(No Model.) 2 Sheets—Sheet 1.

D. H. SMITH.
PNEUMATIC TIRE.

No. 491,296. Patented Feb. 7, 1893.

Witnesses:
J. D. Garfield
K. I. Clemons

Inventor:
Daniel H. Smith
per Chapin & Co.
Attys.

(No Model.) 2 Sheets—Sheet 2.
D. H. SMITH.
PNEUMATIC TIRE.
No. 491,296. Patented Feb. 7, 1893.
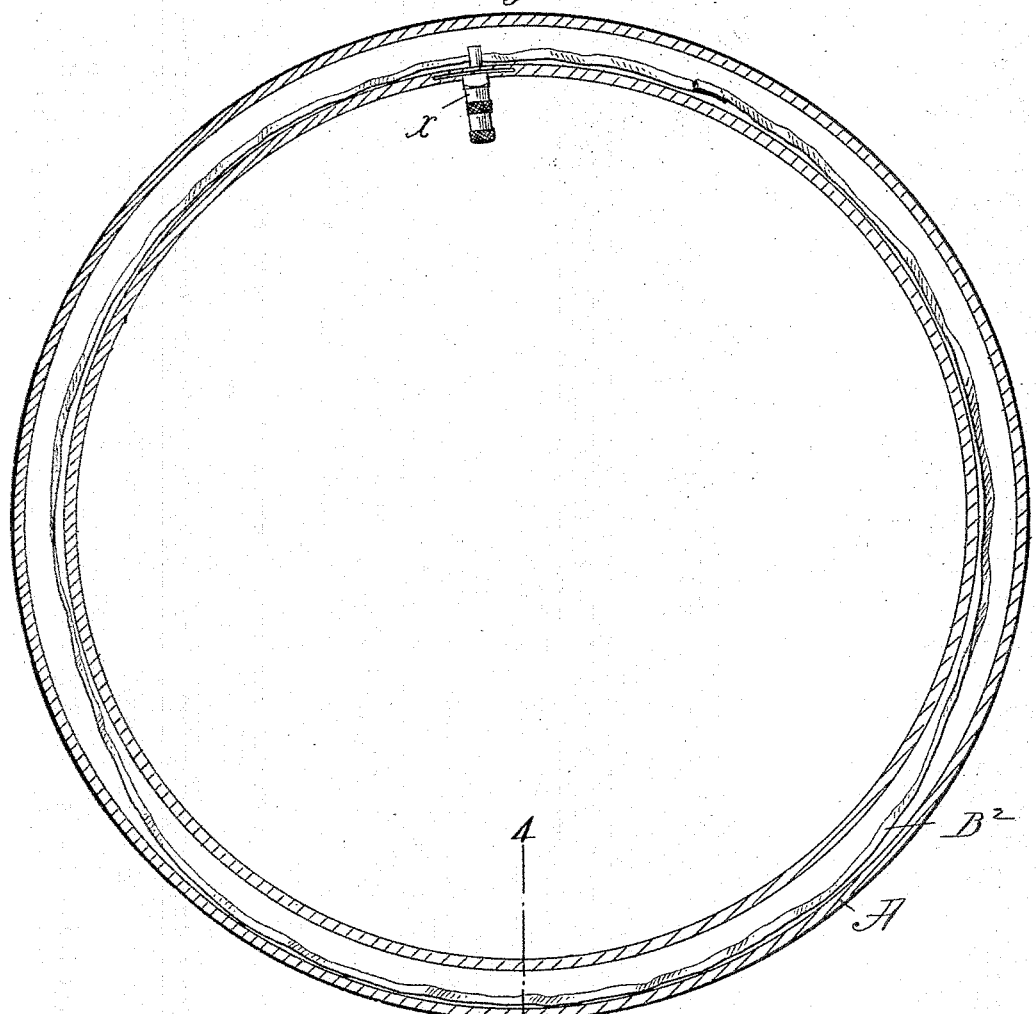
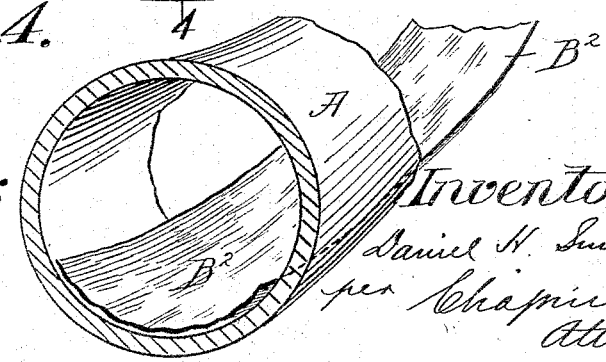

UNITED STATES PATENT OFFICE.

DANIEL H. SMITH, OF HOLYOKE, MASSACHUSETTS.

PNEUMATIC TIRE.

SPECIFICATION forming part of Letters Patent No. 491,296, dated February 7, 1893.

Application filed June 24, 1892. Serial No. 437,916. (No model.)

*To all whom it may concern:*

Be it known that I, DANIEL H. SMITH, a citizen of the United States, residing at Holyoke, in the county of Hampden and State of Massachusetts, have invented new and useful Improvements in Pneumatic Tires, of which the following is a specification.

The object of this invention is to so improve a pneumatic tire for the wheel of a bicycle, or other vehicle, that any punctures, perforations, or ruptures of the air-ring or tire proper will be automatically closed, and all so that the tire will remain, even when punctured or ruptured, at substantially the maximum or desired degree of inflation.

To this end the invention consists in the combination with the air-tube of a pneumatic tire, of a suitably formed web or layer of thin, impermeable material located and extended around, within, and near the inner wall of the air-tube, the same being throughout substantially its entire area normally slack or free from the inner wall of the air-tube and being of such an unclosed construction as to constitute no receptacle for air but to be subject to an equilibrium of the air pressure upon its opposite sides so that it will readily recede from said wall on the passage through the latter of a perforating or puncturing object, all whereby the web will not be thereby perforated, and so that the portion of the flexible web, adjacent the puncture of perforation will be then susceptible of being automatically sucked, forced, or drawn, to the perforation insuring the closure thereof.

The invention, as carried out in a preferred form, embodies the said flexible, impermeable web of tubular form, so applied however, within the inflatable tire that it is not subject to tension by inflation, nor to collapse but remains slack and most readily yielding, even while the tire proper is fully inflated, and all as will hereinafter more fully appear and be set forth in the claims.

Reference is to be had to the accompanying drawings in which exemplifications of this invention are illustrated.

Figure 1:
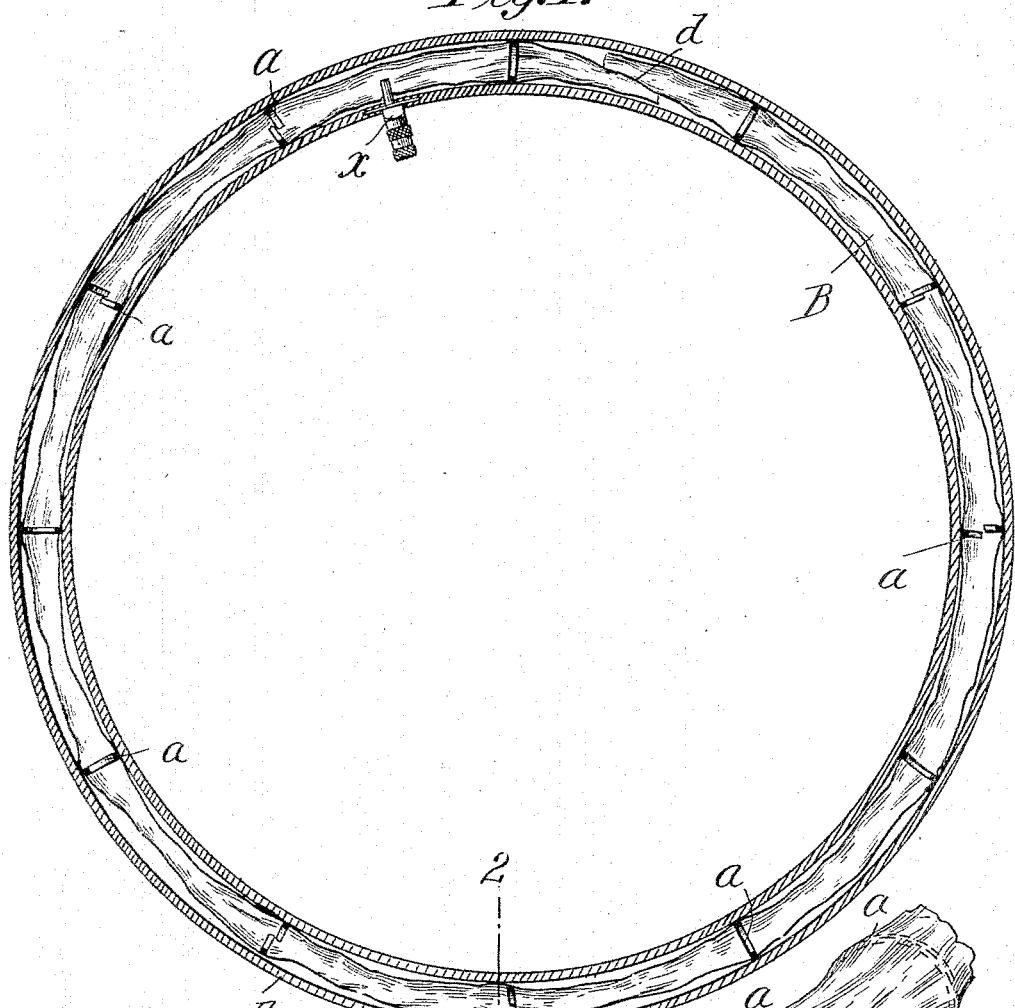
Figure 2:
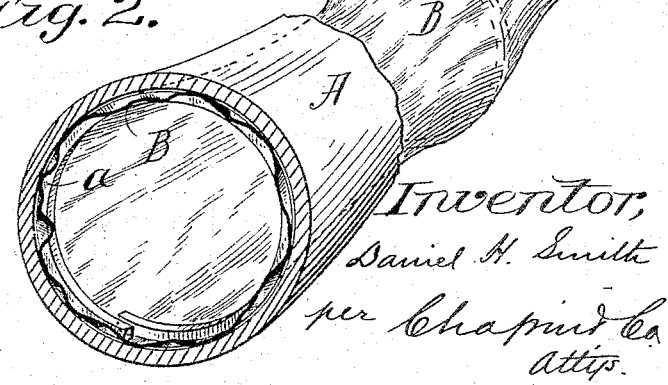

Figure 1 is a sectional view centrally through the improved tire on a plane at right angles to the axis. Fig. 2 is a partial cross section and perspective view of the improved tire on a large scale, the portion which is shown in section, being taken on the plane 2—2—, Fig. 1. Figs. 3 and 4 are views similar to Figs. 1 and 2, but showing the flexible impermeable web as formed and adapted so as to protect merely the tread side of the tire.

In the drawings, A represents the pneumatic tire proper, which may be of any of the usual or approved constructions, involving, in its fabrication, india rubber or gutta percha, either pure or in any of their elastic compounds, or in addition thereto, layers of textile or other suitable material.

B represents the impermeable web, or device for service in the tire, for closing any perforation which may be made in the tire A. In Figs. 1 and 2 this device will be understood as consisting of a tube formed of elastic rubber tissue, or like impermeable material, which, for instance, in substitution, may be of rubber cloth or other flexible air proof sheet material. This tube has a diameter about corresponding to the internal size of the pneumatic tire and has its extremities carried the one beyond the other with the surfaces which are in contact, as seen at *d*, cemented together, or otherwise united. The ends of the tube, one or both, are left open, or in lieu thereof this tube may have one or more holes through it whereby it may have no considerable degree of inflation, but whereby it may be subject as to all portions thereof to substantially an equilibrium of the air pressure within the air-tube, at all times, except when the conditions within the air-tube are changed by reason of puncture when such equilibrium will be instantly so modified as to cause a portion of the internal tissue next to the puncture to close the latter automatically. It will therefore be understood that the air pressure in the air-tube will neither collapse the tube, B, nor have any action to inflate it whereby it will lie in tension against the inner wall of the air-tube. Said tube, B, is provided internally at intervals along its length, with annular ribs, or rings, *a*, *a*, of rubber, which while less flexible than the tissue forming the tube, B, are so flexible as not to impair the general elasticity of the tire, and said ribs or rings closely hug the inner walls of the tire and maintain the tissue-formed tube in a suitable degree of distension, whereby all portions of its surface may be in suitable proximity to the inner tire wall. The valve, $x$, by means of which to inflate the tire, is preferably extended through the said flexible tube, B; and at the line of inflation said tube becomes so distended as to somewhat more closely conform to the inner walls of the tire proper, but it shortly becomes relaxed between the ribs, sagging or hanging limp, somewhat as indicated in the drawings, owing to the fact that the said tube, B, is unclosed.

In the use of the improved pneumatic tire upon a bicycle, or other wheel, any sharp, puncturing object, onto which the tire may be run, should it penetrate the tire proper, if forced inwardly far enough, will, instead of piercing the relaxed and flexible tissue, force it away from the inner tire wall; the air which would find its exit through the hole thus made will cause the drawing of the adjacent slack tissue directly to the hole, whereat it will be continuously maintained. Assuming that it is necessary to insure the tire against the effects of perforation only at the tread side thereof, the web of impermeable, flexible material may only be in the form of a circular strip or layer, as indicated at $B^2$, in Figs. 3 and 4.

A pneumatic tire may be constructed even lighter, and consequently more flexible, than heretofore, for the reason that it is of less consequence that it remain imperforate, when equipped with a leak-closing web, substantially as here contemplated, and the total weight of a web or tube which will effectually serve the purpose in substantially the manner designed need be but from one to two ounces in weight for each tire.

I claim:—

1. The combination with the air-tube of a pneumatic tire, of a tube of thin, impermeable, flexible material located and extended around, within, and near the inner wall of the air-tube, the same being of an apertured construction, that is, open to communication with the space within the air-tube, so as to receive an equilibrium of the pressure within the tire at opposite sides thereof, whereby when the air-tube is inflated, said inclosed tube will neither be collapsed, nor, by inflation, forced in tension against the inner wall of the inflatable tube, substantially as and for the purpose set forth.

2. The combination with the air-tube of a pneumatic tire, of a suitably formed web or layer of thin, impermeable material, located and extended around, within, and near the inner wall of the air-tube, the same being throughout substantially its entire area normally slack and unsecured or free from the air-tube-inner-wall and of such an unclosed construction as to be subject to an equilibrium of the pressure within the tire at the opposite sides thereof, whereby it may not be distended or forced in tension against the inner wall of the air-tube, substantially as explained and for the purpose set forth.

3. The combination with a pneumatic tire, of a tube of thin, flexible, impermeable material, located within and extended around and adapted to lie near the inner wall of the tire, said tube being through substantially all portions thereof normally slack, and unsecured or free from the inner tire wall, and the valve for the tire having a tubular portion thereof extended within said inclosed tube and said inclosed tube having an apertured construction whereby it may be subject to an equilibrium of air pressure upon its inner and outer sides, substantially as described.

4. The combination with a pneumatic tire, of a tube of freely flexible, impermeable material, located within and extended around and adapted to lie near the inner wall of the tire and provided at intervals with the transverse circular ribs which substantially form within the tire proper and which ribs, while flexible, are less flexible than the said tube, and said tube being normally slack or free from the inner tire wall, substantially as and for the purposes set forth.

DANIEL H. SMITH.

Witnesses:
WM. S. BELLOWS,
HENRY A. CHAPIN.